March 30, 1965  T. L. T. MANN  3,175,848
CONDUIT COUPLING HAVING HINGED LOCKING OR COVERING MEANS
Filed June 11, 1964  2 Sheets-Sheet 1
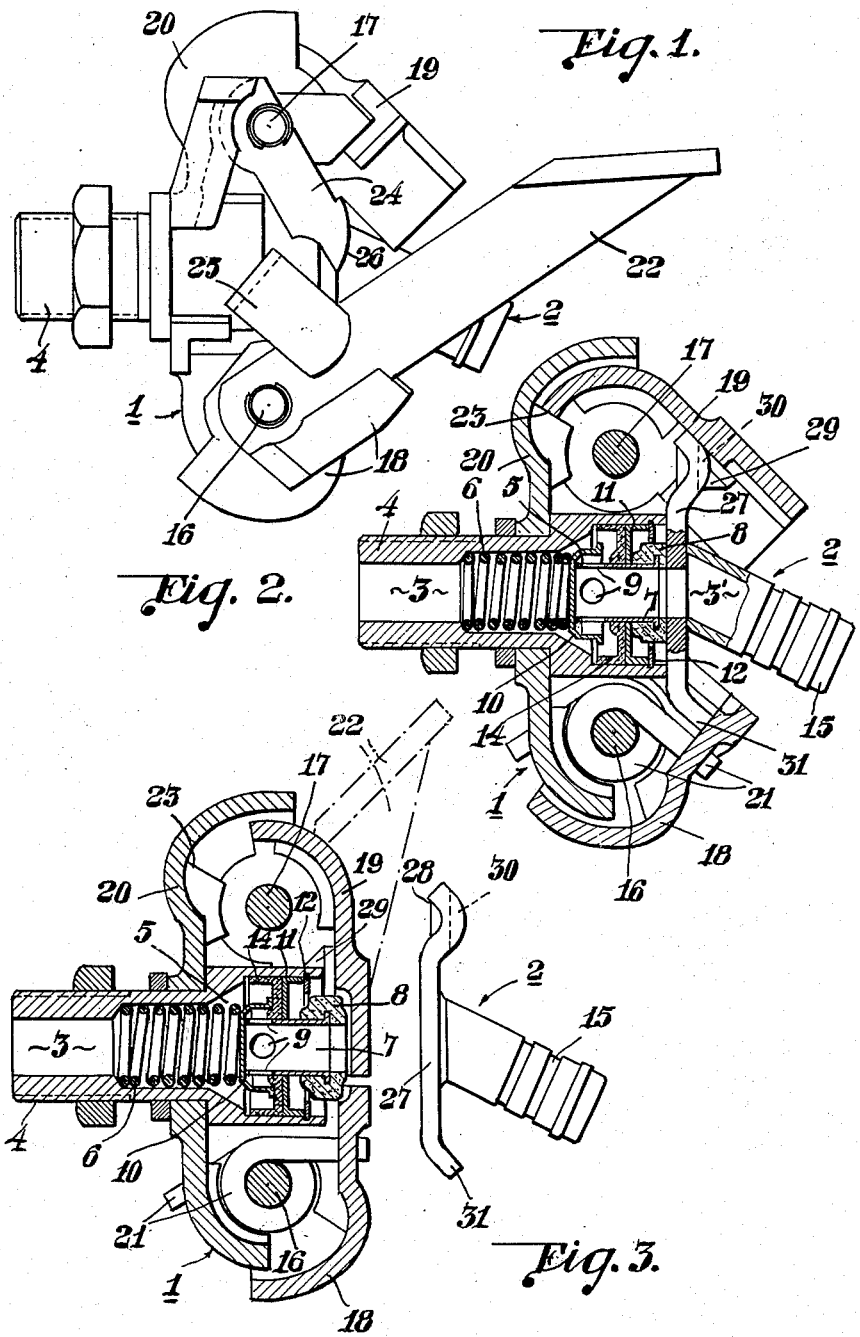

March 30, 1965 T. L. T. MANN 3,175,848
CONDUIT COUPLING HAVING HINGED LOCKING OR COVERING MEANS
Filed June 11, 1964 2 Sheets-Sheet 2

INVENTOR.
TORSTEN LARS TEODOR MANN
BY *Arnold Robinson*
ATTORNEY.

United States Patent Office 3,175,848
Patented Mar. 30, 1965

3,175,848
CONDUIT COUPLING HAVING HINGED LOCKING OR COVERING MEANS
Torsten Lars Teodor Mann, Johanneshov, Sweden, assignor to Mann & Co. Aktiebolag, Johanneshov, Sweden, a joint-stock company of Sweden
Filed June 11 1964, Ser. No. 383,536
Claims priority, application Sweden, Dec. 9, 1959, 11,596/59
4 Claims. (Cl. 285—119)

This application is a continuation-in-part of my prior application Ser. No. 72,896, filed on December 1, 1960, under the title "Pressure Medium Conduit Coupling" and now abandoned in favor of the present application.

The invention relates to a coupling of the quick-release type particularly useful in compressed air conduits such as the ones used in remotely controlled brake systems for trailers and comprising a housing for fixed mounting, e.g. on the tractor, and a coupling member connectable thereto and adapted to be secured to the end of a flexible conduit, e.g. from the trailer. More particularly the invention is concerned with couplings of the type referred to wherein the housing is provided with spring-actuated means arranged, in the operative position of the coupling, to retain the coupling member in sealing engagement with a seat around the mouth of a pressure medium passage arranged in the housing and also, in the inoperative position of the coupling, to cover said seat and thus protect the latter from mechanical injury, dirt and the like.

Quick-release couplings of the type described above are known, but these existing couplings have not been suitable for use in conduits having a positive internal pressure but only for vacuum conduits, where the atmospheric pressure tends to hold the coupling parts together. In positive pressure conduits the internal pressure instead tends to burst the coupling parts away from each other and, therefore, a quick-release coupling for such conduits requires an entirely different construction which, above all, can offer considerably greater power for keeping the coupling parts together in their operative positions. The present invention has for its object to present a useful and practical solution of this particular problem by which, as a main feature, the use of separate covers for protecting the seat or seats of the housing, when the coupling member is removed therefrom, is completely avoided.

An important characteristic structural feature of the coupling according to the invention is the provision of a housing equipped with two approximately parallel axles having lid portions swingable in opposite directions thereon and which in their closed positions together form a substantially continuous covering for the interior of the housing. Further, through the actuation of a control lever the lid portions may be swung out to receive the coupling member between them, and, when the control lever is again released, the lid portions are spring actuated to cooperate in retaining and pressing said coupling member against the seat. The pressing of the coupling member against the seat is achieved by a wedging action so that even a moderate spring pressure exerted on the one lid portion is enough to securely retain the coupling member in place even with a rather high internal pressure in the conduit.

The coupling member suitably takes the form of a generally rectangular plate or body having two opposite edges designed for cooperation with the inner surfaces of the two lid portions, but it may also be square or oval in shape.

Preferably, one of the lid portions is arranged to swing out against an abutment in the housing to thus occupy a position in which it forms an acute angle with the contact surface of the seat and serves as a keeper inside which the related edge of the coupling member plate is arranged to be retained under the influence of a spring force exerted on the other lid portion.

Further features of the invention will appear from the following detailed description of an embodiment of the invention which has been illustrated in the accompanying drawings, wherein:

FIG. 1 is a side elevational view of a first coupling embodying this invention with the coupling member attached to the housing, FIG. 2 is a sectional view showing the coupling parts of FIG. 1 assembled, and FIG. 3 is a similar sectional view of the coupling showing the coupling parts when separated.

Figure 4:
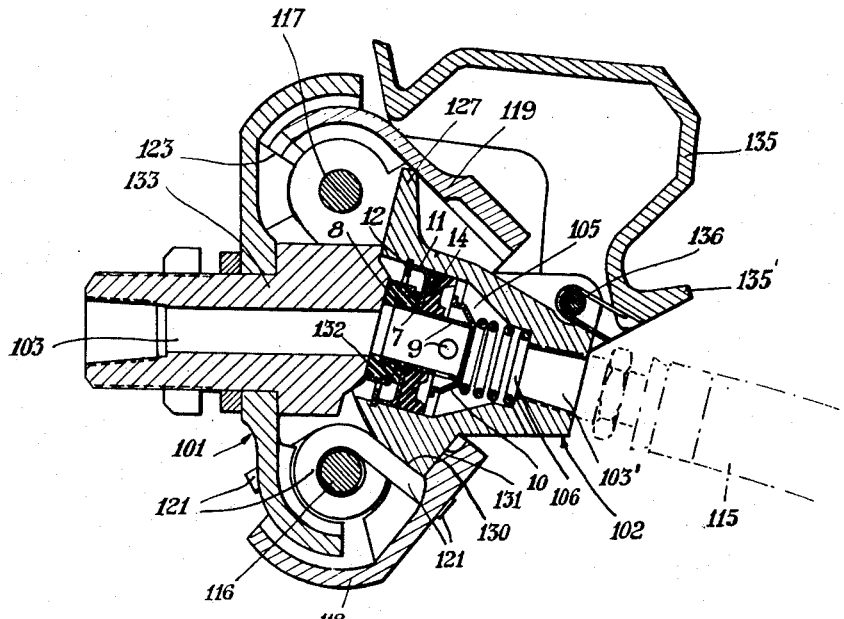
FIG. 4 is a sectional view similar to FIG. 2 but showing a modified type of coupling also embodying the invention, the couplings parts being shown in assembled position.

The coupling shown in FIGS. 1–3 of the drawing comprises, as best appears from FIG. 3, two main parts, that is a housing 1 intended to be mounted in fixed position on the tractor, and a coupling member 2 intended to be secured at the end of a flexible conduit or hose (not shown) extending from the brake system of the trailer. The housing 1, which is suitably formed of metal castings, has one or more through-passing pressure medium passages 3 extending therethrough and registering with corresponding passages 3' in the coupling member 2. When there are several medium passages in the two coupling parts, such passages are located laterally in line with one another. Each passage in the housing starts in a nipple 4 and then widens into a chamber 5 containing a valve device acted upon by a pressure spring 6.

The valve device consists of a sleeve 7 the outer end of which is provided with an annular rubber ring 8 serving as a seat for the coupling member 2 as will be explained later on. In its inner end portion the sleeve 7 is provided with a number of holes 9 extending radially through its wall and the sleeve abuts with its inner end against the bottom of a cup 10 which is, in turn, acted upon by the spring 6. The sleeve 7 is axially displaceable in a central aperture of a cup-like washer 11 which, by means of a locking ring 12, is retained in the outer portion of the chamber 5. A sealing collar 14 rests against the back of washer 11 and, with its outer edge, seals against the internal wall of the chamber 5, while its inner edge sealingly encloses the sleeve 7.

The edge of the cup 10 is sealingly pressed against the collar 14 by the spring 6 as long as the coupling is inoperative, which will appear from FIG. 3. Hence in such position no pressure medium can pass from the nipple 4 out through the valve sleeve 7. If, however, the sleeve 7 is pressed inwardly against the pressure of the spring 6, as the case will be when the coupling member 2 is attached to the housing, as in FIG. 2, the edge of the cup 10 will be moved away from the inner surface of the collar 14 and provide a free passage for the pressure medium out through the sleeve 7 and further into the corresponding passage 3' of the coupling member 2 which terminates in a nipple 15 for a hose (not shown).

The housing 1 is provided with two substantially parallel axles 16 and 17 on which lid portions 18 and 19 are respectively swingable. The lid portions 18 and 19 preferably are so shaped in relation to the rear part 20 of the housing that they may be formed by suitable division or cutting up of the same type of casting as used for forming said rear housing part 20. The two lid portions 18 and 19, which are arranged to swing out in opposite directions about the shafts or axles 16 and 17, are normally kept in the closed position of FIG. 3 by means of a strong spring 21 acting on the lower lid portion 18 as will be explained hereinafter. The upper lid portion 19 is suitably somewhat longer than the lower one 18 so that it extends beyond the mouth of the sleeve 7, while the lower lid portion 18 is provided with a handle or control lever 22 which is integral with, or otherwise secured to lid portion 18 and makes it possible to force open the lid portions.

The upper lid portion 19 is, as shown in FIG. 2, arranged to swing up into a position where its top edge engages an abutment surface 23 in the rear part of the housing, and where the lid portion forms an angle of about 45° with respect to the front of the housing. The lower lid portion 18, on the other hand, is arranged to swing down a slightly larger angle to provide room for the insertion of the coupling member 2 between the lid portions.

In order to provide for simultaneous opening of the two lid portions 18 and 19 upon actuation of the handle 22 said lid portions are, at the one side of the hosuing, equipped with cooperating arms 24 and 25 that may be integral with lid portions 19 and 18 respectively (FIG. 1) and which are so arranged and formed that the upper lid portion 19 is forced to swing upwardly by engagement of arm 25 with arm 24 when the lower lid portion is swung down by the manipulation of the handle 22. The upper lid portion 19 will then move into contact with the abutment 23 when the lower lid portion 18 is pressed down sufficiently to permit insertion of the coupling member 2 between the two lid portions. FIG. 1 shows the lid portions and their arms 24 and 25 respectively in a position where the lower lid portion has sprung back for clamping the coupling member 2 after release of the handle 22 while the upper lid portion remains in contact with the abutment 23. This will explain why the arms 24 and 25 in FIG. 1 do not engage each other in FIG. 1. As soon as the coupling member 2 is removed the spring 21, of course, tends to fully close the lower lid portion 18, i.e. to swing the handle 22 upwardly. When doing so the handle 22 will in turn engage a curved edge 26 on the arm 24 so that the upper lid portion 19 is simultaneously closed to the position of FIG. 3.

The coupling member 2 comprises a generally rectangular plate 27 having one or more apertures from which the hose nipples 15 extend. The upper longitudinal margin 28 of the plate 27 is bent into a channel-shape to engage the inside of the upper lid portion 19 when the coupling parts are put together as in FIG. 2. On its inside the lid portion 19 has a number of projections 29 arranged to engage with corresponding recesses 30 in the ridge of the channel-like margin 28 of member 2 so that the coupling member 2 is hingedly articulated about its upper edge both when being pressed against the valve seat 8, whereby the sleeve 7 will be actuated upon substantially axially, and when an excessive load or pull is exerted on the coupling member to separate the latter from the housing, in which case the coupling member 2 is rocked upwardly about the projections 29 and its lower edge is first freed from the lower lid portion 18. The inclined position of the hose nipples 15 relatively to the plate 27 also has for its purpose to ensure such hinged action when an excessive pull is exerted on the hose or hoses.

The lower edge 31 of the plate 27 is slightly bent outwardly to engage with the inside of the lower lid portion 18, as shown in FIG. 2, and it is evident that the lid portion 18 in the operative position of the coupling with the power exerted by the spring 21 tends to force the plate 27 against the seat formed by the annular rubber cover 8 on the valve sleeve 7 and to simultaneously wedge in the plate under the keeper formed by the lid portion 19. When the coupling member 2 is pressed against the valve sleeve 7 the latter is, of course, displaced inwardly so that the valve is automatically opened for free passage of air or other fluid under pressure therethrough.

When the coupling parts are to be put together the handle lever 22 is actuated so that the lid portions 18 and 19 are swung outwards from their closed positions. The plate 27 of the coupling member 2 is then inserted with its upper edge under the upper lid portion to receive the projections 29 in recesses 30, while the lower edge of the plate 27 is moved in over the upper edge of the lower lid portion 18. During this manipulation the lever 22 must, of course, be depressed somewhat further than is shown in FIG. 1. When the handle lever is then released, the lower lid portion 18 will spring back to clamp the coupling member 2. Thus the upper lid portion 19 is not required to exert any spring pressure on the plate 27 of the coupling member 2, although this could, of course, also be the case. On the other hand also the upper lid portion 19 may be acted upon by a weaker spring either towards its closed position—in which case the cooperation between the control lever 22 and the curved surface 26 on arm 24 may be dispensed with—or towards its open position—in which case the arm 25 may be omitted.

Apparently the coupling of FIGS. 1–3 is useful only when the housing is mounted on the tractor carrying the source of pressure medium. Frequently it may be desirable, however, to mount the coupling housing on the trailer and supply the pressure medium to it through a hose or flexible conduit extending from the tractor and having the coupling member secured to its outer end. Such an arrangement of parts obviously requires the valve device to be located in the coupling member instead of in the housing as hereinbefore described. A modified form of the coupling embodying the invention and advantageously fulfilling the requirements in such a case is shown in FIGS. 4 and 5.

The housing 101 of this modified form of the coupling is very similar to the housing 1 of FIGS. 1–3 as far as the outer appearance is concerned. Upper and lower lid portions 119 and 118 respectively are swingable about two substantially parallel axles 117 and 116 respectively. The lower lid portion 118 is acted upon by a spring 121, and when the lower lid portion is forced open by the manipulation of a hand lever similar to the lever 22 in FIG. 1 but not shown, the upper lid portion 119 will automatically open just as in the previously described type of coupling and move into contact with an abutment 123 so that the coupling member 102 can be received between the two lid portions.

Figure 5:
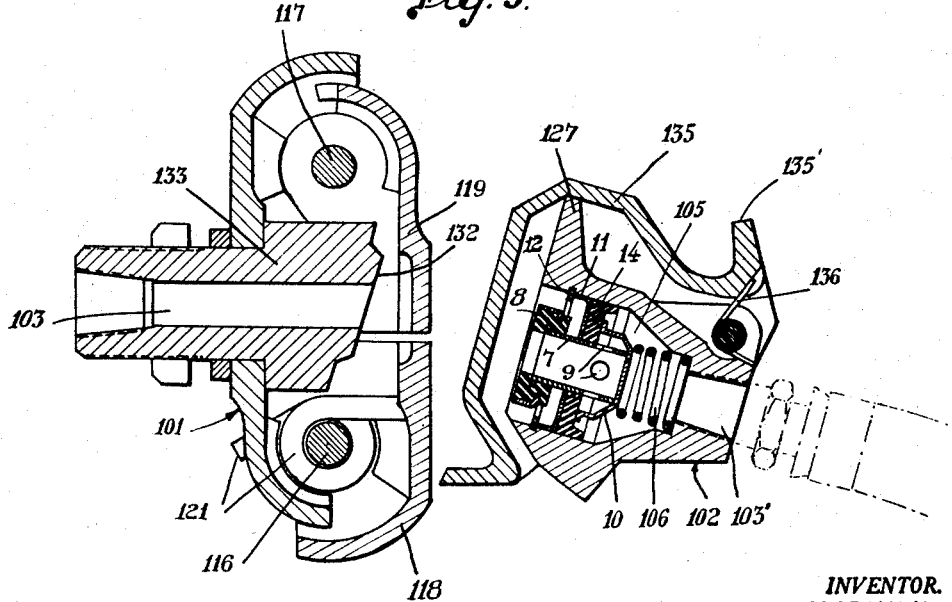
FIG. 5 is a sectional view of the coupling of FIG. 4 showing the coupling parts thereof when separated.

The main difference between the housing 101 of FIGS. 4 and 5 and the housing 1 of FIGS. 1–3 is that the former has a passage 103 terminating directly in an oblique seat 132 formed at the end of a stud 133 and slightly projecting therefrom. The seat 132 is well protected by the lid portions 118 and 119 when the latter are closed as shown in FIG. 5. It should be noted that there is no valve device incorporated in the housing 101. Instead the valve device is housed within the coupling member 102 which for this purpose takes the form of a hollow body having a passage 103' connected to a hose 115 and merging into a wider chamber 105 housing a spring 106 and all the same valve parts 7–14 as already described in detail in connection with FIGS. 1–3.

The coupling member 102 has an upper flange 127, wedged under the upper lid portion 119 when the coupling member is connected to the housing 101, and a lower oblique or curved brest 130 with a rear abutment surface 131 for the lower lid portion 118, and for protection when not in use it has a swingable protective shell 135 which by the action of a suitable spring 136 tends to occupy the position shown in FIG. 5. The shell 135 has a thumb-grip or flange 135' making it easy to swing the shell out of the way when the coupling member is to be attached to the housing 101.

Obviously the attached coupling member 102 will be gripped and reliably retained by the lid portions 118 and 119 of the housing 101 in substantially the same way as already described in connection with FIGS. 1–3. The seat 132 will then press and open the valve device to establish a free flow passage for the pressure medium from the hose 115 into the passage 103 of the housing 101.

As already pointed out the invention must not be considered as limited to the embodiments shown because several modifications as far as the detail design is concerned may be resorted to without losing the favorable result pursued. In particular, of course, this is true as far as the detailed construction of the valve device included in the housing or the coupling member respectively is concerned.

I claim:

1. In a coupling for a conduit carrying fluid under pressure; the combination of a housing having a passage for the fluid extending therethrough and provided with a seat at one end, two lid portions swingably mounted on said housing to move about parallel axes at opposite sides of said seat between closed positions, where said lid portions come together and form a protective cover for said seat, and opened positions, where said lid portions are swung outwardly from said housing at acute angles with respect to a plane through said seat perpendicular to the longitudinal axis of said passage, cooperative means on said lid portions for effecting simultaneous swinging movements thereof in opposite directions between said opened and closed positions, spring means urging one of said lid portions to said closed position thereof, and a coupling member insertable between said lid portions, in said open positions of the latter, to engage against said seat, said coupling member having oppositely inclined opposed marginal surfaces engageable by said one lid portion and by the other lid portion, respectively, so that said one lid portion acted on by said spring means urges said coupling member both against said seat and into wedging engagement with said other lid portion.

2. In a coupling for a conduit carrying fluid under pressure, the combination as in claim 1; further comprising an abutment in said housing engageable by said other lid portion to limit the outward swinging movement of the latter with respect to said housing at said opened position of said other lid portion.

3. In a coupling for a conduit carrying fluid under pressure, the combination as in claim 1; wherein said lid portions have different lengths so that, in said closed positions of the lid portions, the separation between the two lid portions is displaced from said seat.

4. In a coupling for a conduit carrying fluid under pressure, the combination as in claim 1; further comprising a handle extending from said one lid portion to permit manipulation of the latter to said opened position thereof; and wherein said cooperative means on the lid portions for effecting simultaneous swinging movements thereof includes first and second arms on said one lid portion and said other lid portion, respectively, said first arm engaging against said second arm during outward swinging of said one lid portion toward said opened position thereof to effect outward swinging of said other lid portion to its opened position, and an arcuate surface on said second arm engageable by said handle during inward swinging of said one lid portion to its closed position to effect corresponding inward swinging of said other lid portion to its closed position.

References Cited by the Examiner
UNITED STATES PATENTS

| | | | |
|---|---|---|---|
| 360,924 | 4/87 | Solano | 137—614.01 |
| 1,797,383 | 3/31 | Wahl et al. | 137—231 |
| 2,222,746 | 11/40 | Kamenarovic | 285—317 X |
| 2,444,451 | 7/48 | Kelso | 251—149.9 |
| 2,457,251 | 12/48 | Main | 137—601 |

CARL W. TOMLIN, *Primary Examiner.*